T. A. McMURTRIE.
PIPE MAKING MACHINE.
APPLICATION FILED MAR. 26, 1917.

1,297,208.

Patented Mar. 11, 1919.
4 SHEETS—SHEET 1.

INVENTOR.
THOMAS A. McMURTRIE.
by Frank Waterfield.
ATTORNEY.

T. A. McMURTRIE.
PIPE MAKING MACHINE.
APPLICATION FILED MAR. 26, 1917.
1,297,208.
Patented Mar. 11, 1919.
4 SHEETS—SHEET 3.
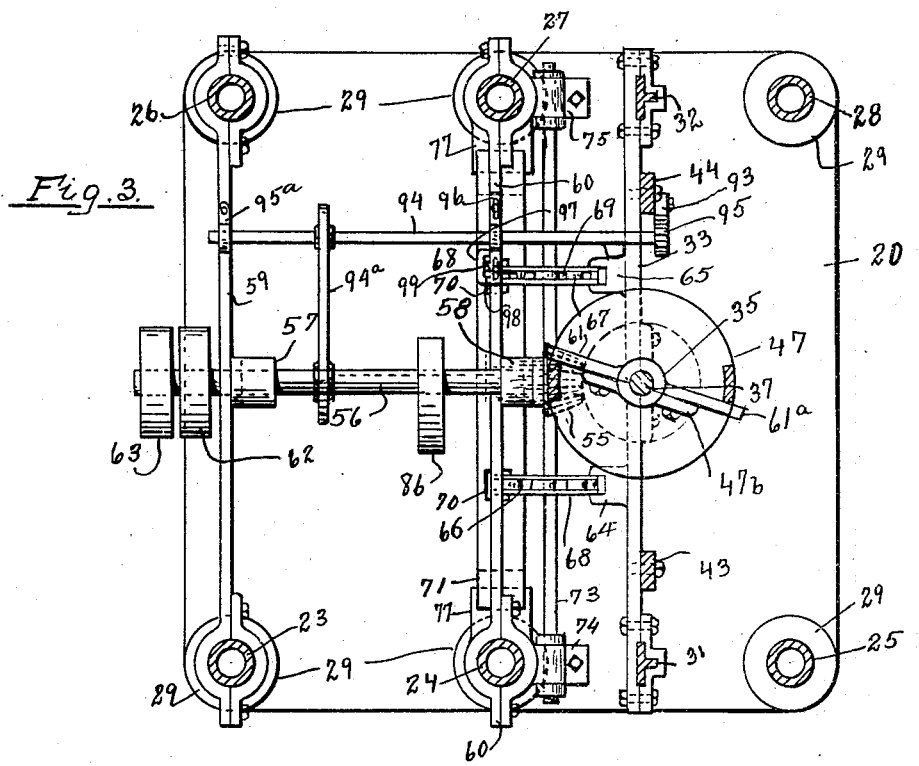
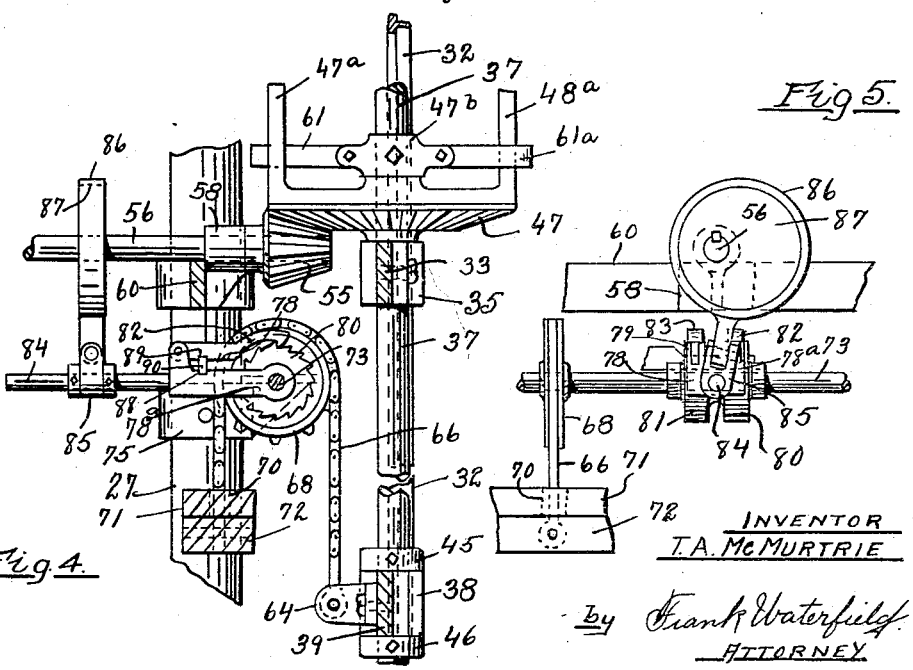
INVENTOR
T. A. McMURTRIE
by Frank Waterfield
ATTORNEY

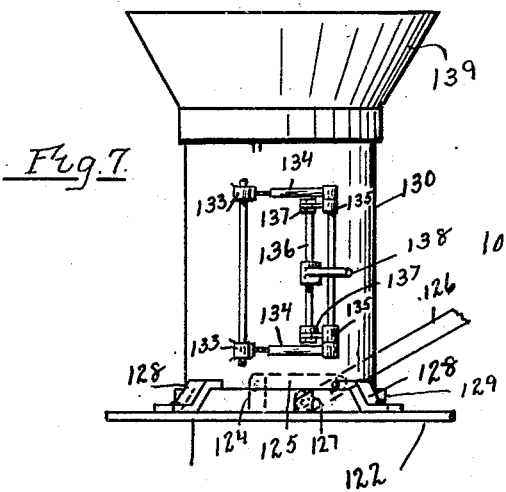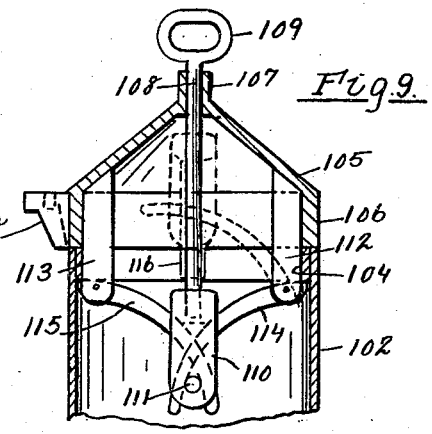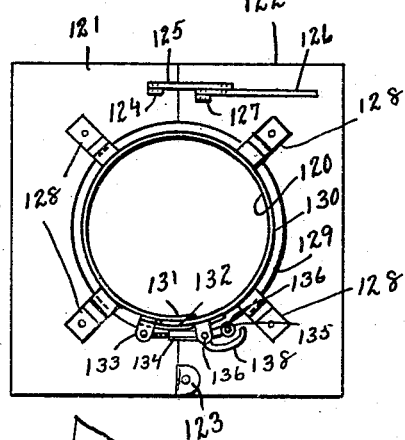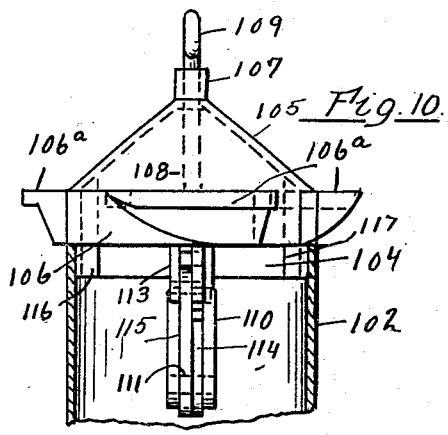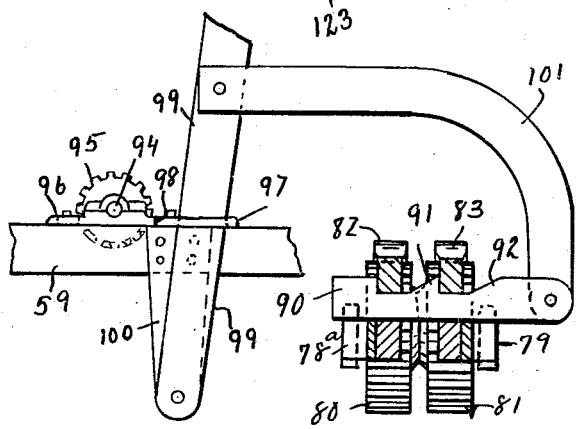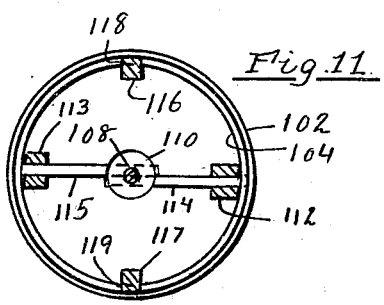

UNITED STATES PATENT OFFICE.

THOMAS A. McMURTRIE, OF LOS ANGELES, CALIFORNIA, ASSIGNOR OF TWO-THIRDS TO JOHN A. FLAHIVE, OF LOS ANGELES, CALIFORNIA.

PIPE-MAKING MACHINE.

1,297,208.        Specification of Letters Patent.     Patented Mar. 11, 1919.

Application filed March 26, 1917. Serial No. 157,499.

*To all whom it may concern:*

Be it known that I, THOMAS A. MCMURTRIE, a citizen of the United States, residing at the city of Los Angeles, county of Los Angeles, and State of California, have invented new and useful Improvements in Pipe-Making Machines, of which the following is a specification.

My invention relates to a machine for making lengths of irrigating, drain and the like pipe composed of concrete or similar plastic material and the object thereof is to provide a machine for this purpose which will be cheap in construction and simple and efficient in operation.

A further object is to provide in a machine of this character, mechanism which will automatically mix and feed the necessary materials into the pipe forming mechanism it only being necessary for the operator to supply the necessary materials into the mixer, cut off the feeding mechanism when a length of pipe is formed and to remove the length of pipe when completed.

Another object is to provide a machine for this purpose in which a combined tamping, troweling and rolling is applied to the pipe while being formed and in which the pressure of force of said motion is automatically relieved as required.

A further object is to provide a machine for forming pipe of plastic material in lengths in which the ends of each length are so formed as to interlock whereby when the lengths of pipe are laid in position for use a continuous unbroken pipe is formed.

Other objects and advantages will appear hereinafter.

I accomplish these objects by the mechanism described herein and illustrated in the accompanying drawings forming a part hereof in which:—

Fig. 3 is a section on the line 3—3 of Fig 1.

Fig. 4 is an enlarged detail of the tamping and forming mechanism.

Fig. 5 is a view taken on the line 5—5 of Fig. 4.

Fig. 6 is an enlarged detail of the tamping and releasing mechanism.

Fig. 7 is a front elevation of the outer pipe form or mold.

Fig. 8 is a top plan of Fig. 7.

Figs. 9 and 10 are fragmentary details of the core and its packer head and tampers.

Fig. 11 is a section on the line 11—11 of Fig. 9.

Figure 1:
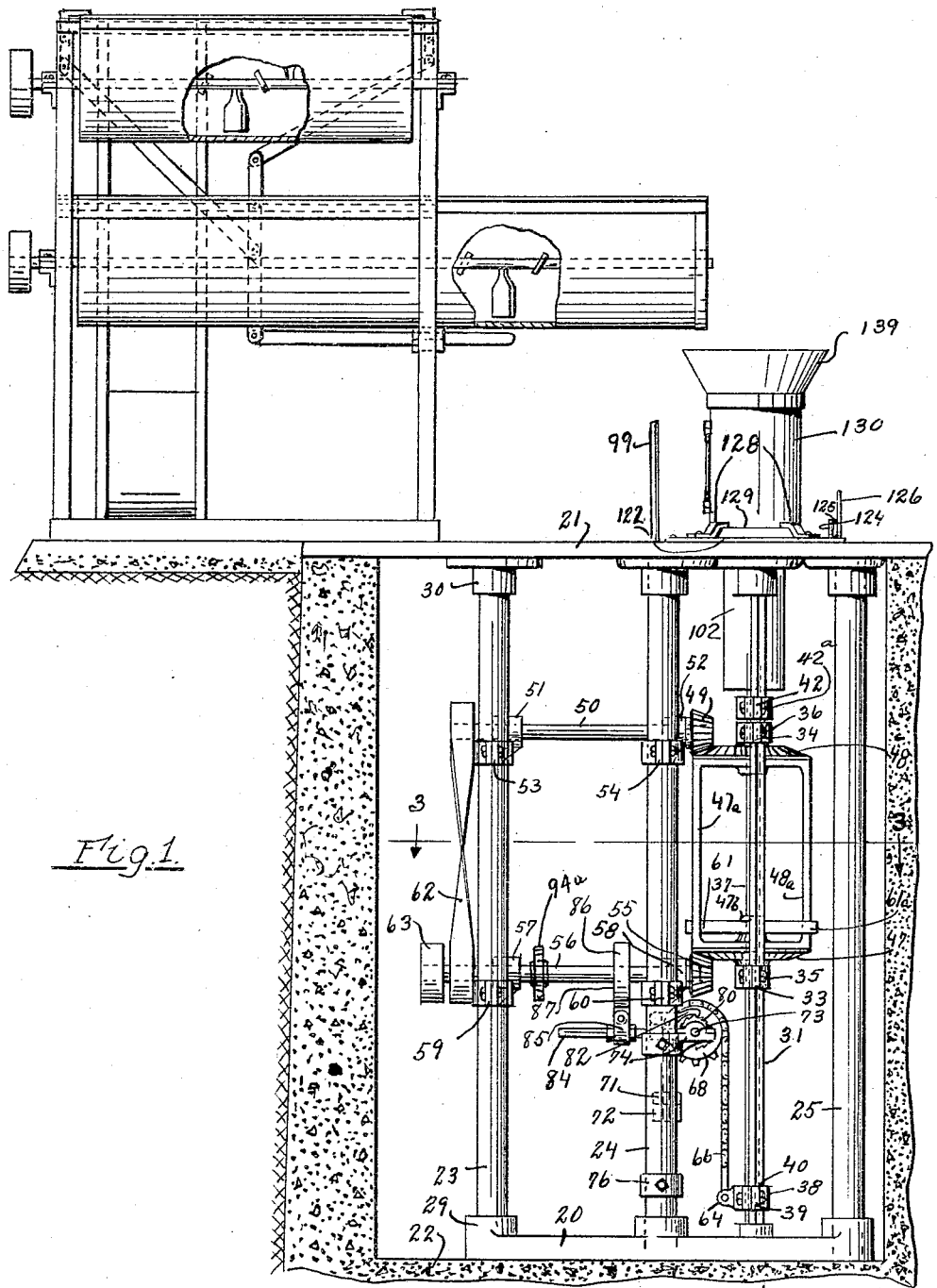
Figure 1 is a side elevation of my machine.
Figure 2:
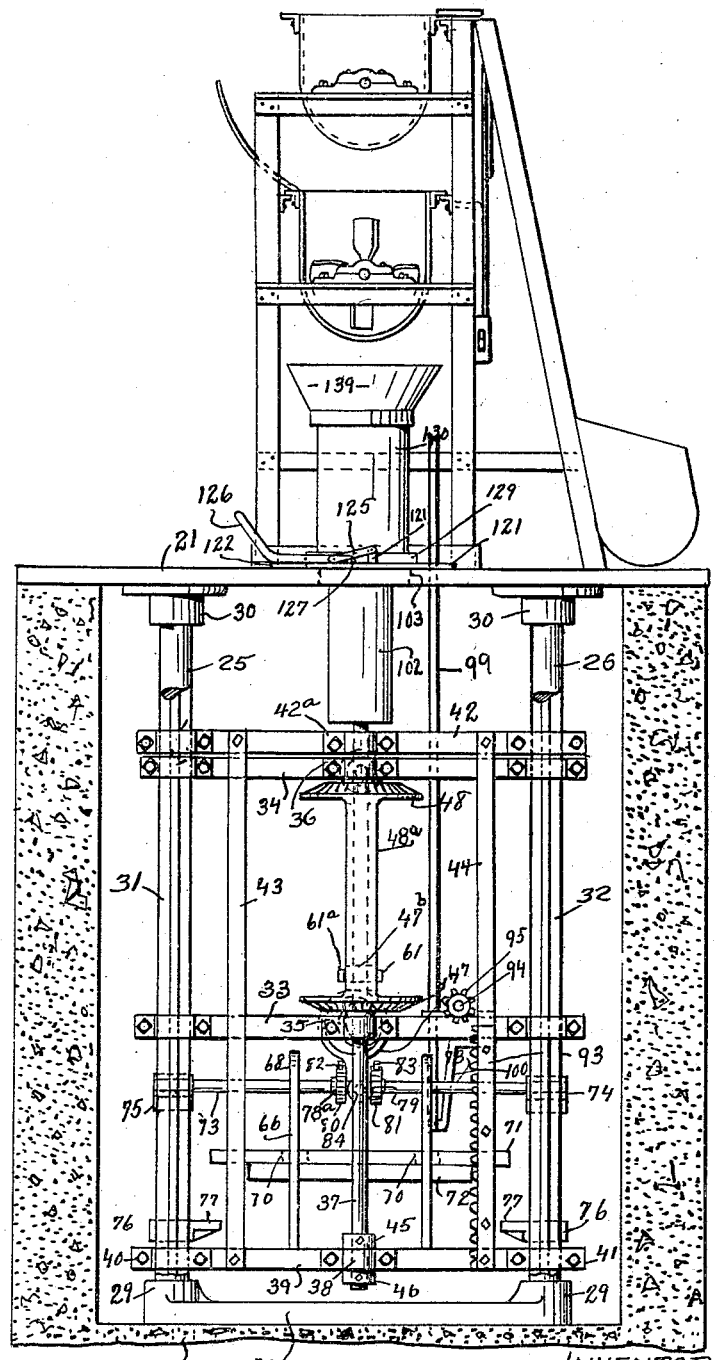
Fig. 2 is a right hand elevation of Fig. 1.

Referring to the drawings 20 designates a rectangular base, and 21 a rectangular platform, base 20 normally resting upon the floor 22 of a pit sunk below the ground, and platform 21 being supported at a suitable distance above base 20, usually the ground line, by vertical posts 23, 24, 25, 26, 27, and 28, posts 23, 25, 26 and 28 being the corner posts and posts 24 and 27 being intermediate posts. Bearings or sockets 29 extending upwardly from base 20, and similar bearings or sockets 30, extending downwardly from platform 21 are provided in which the respective ends of said posts are rigidly mounted. Secured at their ends to base 20 and platform 21, intermediate posts 24 and 25, and 27 and 28, are vertically extending guide rails 31 and 32, substantially T-shaped in cross-section. Extending from guide rail 31 to guide rail 32 at a distance from each end and secured at their ends thereto are horizontal cross-bars 33 and 34, provided centrally of their length with vertical bearings 35 and 36 respectively. A cross-head 39 is slidably mounted at its ends by bearings 40 and 41 on the lower end of guide rails 31 and 32, and is provided with a central vertical bearing 38, and a similar cross-head 42 is mounted on said guide rails immediately above cross-bar 34. Cross-heads 39 and 42 are connected, near their ends, by vertically extending connecting bars 43 and 44 so as to travel together. Revolubly mounted in bearings 35 and 36, of cross-bars 33 and 34, and bearings 38 and 42ª of cross-heads 39 and 42, is a vertically extending core shaft 37, on the lower end of which are provided collars 45 and 46, one at each side of bearing 38, to provide against vertical movement of said shaft in said bearing. Revolubly mounted on shaft 37, between cross-bars 33 and 34 is what I term a transmission member, composed of bevel gears 47 and 48 secured together in spaced relation by vertical bars 47$^a$ and 48$^a$, gear 47 forming the lower end and resting upon the upper end of bearing 35 and being supported thereby, and gear 48 forming the upper end and bearing against the lower end of bearing 36 and being supported by vertical bars 47$^a$ and 48$^a$. Rigidly mounted upon shaft 37 and normally resting upon the upper end of gear 47 is an operating member 47$^b$, provided with outwardly extending arms 61 and 61$^a$, which arms are of a length sufficient to be engaged by the vertical bars 47$^a$ and 48$^a$ of the transmission member. Gear 48 meshes with a pinion gear 49 mounted upon the end of shaft 50 which shaft is revolubly mounted in bearings 51 and 52 centrally of cross-bars 53 and 54 respectively.

Bar 53 is secured at its ends upon posts 23 and 26, and bar 54 is secured at its ends on posts 24 and 27. Gear 47 meshes with a pinion gear 55 mounted upon the inner end of a drive shaft 56.

Shaft 56 is revolubly mounted near its ends in bearings 57 and 58, provided centrally of cross arms 59 and 60 respectively. Arms 59 and 60 are secured at their ends upon posts 23 and 26, and 24 and 27 respectively below cross bars 53 and 54. Shafts 50 and 56 are mounted in alinement vertically and are connected at their outer ends by a crossed belt 62, which belt passes around suitable pulleys mounted on said shafts whereby motion will be imparted to shaft 50 from shaft 56, it being understood that as gears 47 and 48 are mounted with their teeth extending away from each other, it is necessary to rotate said shafts in opposite directions in order to rotate both of said gears in the same direction. A pulley 63 on the outer end of shaft 56 is connected by a suitable belt to a power unit, not shown. Extending rearwardly from the rear side of lower sliding cross-head 39, at a distance from each end, are bifurcated ears or lugs 64 and 65 in which are pivotally mounted one end of lifting chains 66 and 67 respectively, which chains extend upwardly therefrom and pass over sprocket wheels 68 and 69 and then downwardly and pass through openings 70 in the long counterweight 71, and have their free ends pivotally secured to short counterweight 72. Sprockets 68 and 69 are rigidly mounted upon shaft 73, which shaft is revolubly mounted at its ends in bearings 74 and 75 secured upon posts 24 and 27. Loosely mounted upon shaft 73 about centrally of its length, and in vertical alinement with shafts 50 and 56, is a rocker member 78, between the arms 78$^a$ and 79 of which are rigidly mounted, on shaft 73, ratchet wheels 80 and 81. Pivotally mounted at one end in the rear cross bar of rocker member 78 are pawls 82 and 83, the free ends of which engage the teeth of ratchet wheels 80 and 81 and rotate shaft 73.

Extending rearwardly from the cross bar of rocker member 78, centrally thereof, is an operating bar 84 upon the free end of which is rockably mounted a collar 85. Collar 85 is provided with an upwardly extending bifurcated ear in which is pivotally mounted the lower end of an eccentric strap 86. Strap 86 is mounted upon and operated by an eccentric 87 rigidly mounted upon shaft 56, so that as shaft 56 is rotated rocker member 78 will be oscillated and cause pawls 82 and 83 to rotate wheels 80 and 81. The lower edges of pawls 82 and 83 and the upper edges of arms 78$^a$ and 79 are cut away at 88 and 89 to form opposed recesses in which is slidably mounted, to slide transversely, a pawl releasing bar 90. Member 90 has the portions which are mounted in said recesses narrowed or cut away, as best shown in Fig. 6, and provided with upwardly tapering portions 91 and 92 which form lifting or disengaging cams, whereby when said bar is moved to the left in Fig. 6, cams 91 and 92 will elevate or disengage the free ends of pawls 82 and 83 from engagement with the teeth of ratchet wheels 80 and 81. Rigidly mounted upon the outer side of vertical connecting bar 44, at the lower end thereof, and in alinement therewith is a rack bar 93, which is preferably of a length a little less than the total vertical travel of shaft 37. Rack bar 93 is adapted to mesh with a spur gear 95 rigidly mounted upon a shaft 94, which shaft is revolubly mounted near its ends in bearings 95$^a$ and 96.

Bearing 95$^a$ is pivotally mounted upon the upper face of cross bar 59 to move transversely, and bearing 96 is slidably mounted upon the upper face of cross bar 60 to slide longitudinally, so that by sliding bearing 96 along bar 60, gear 95 will be brought into or out of engagement with rack bar 93, the purpose of which will be hereafter explained. Projecting from one side of the innermost end of bearing 96 is an ear 97, through which extends an elongated slot 98, and through this slot is passed the lower end of an operating lever 99. Lever 99 is pivotally mounted at its lower end in a bearing 100 extending downwardly from cross bar 59. The other end of lever 99 extends upwardly and terminates in a handle at a suitable distance above the platform 21, and may be provided with suitable means, not shown, for locking the same in its desired position. It will be noted that slot 98 is longer than the width of lever 99 so that said lever has a limited movement in said slot.

Pivotally connected to lever 99 just above ear 97 is one end of a link 101, the other end of which is pivotally connected to one end of pawl releasing bar 90, so that movement of lever 99 is communicated to bar 90. It will be noted that by this construction, a limited movement of lever 99 will cause the cams of bar 90 to disengage the pawls from the ratchet wheels and that a still further movement of said lever will slide bearing 96 to bring gear 95 into engagement with rack bar 93.

Rigidly mounted upon the upper end of shaft 37 is a hollow cylindrical core 102, which extends upwardly and passes through an opening 103 in platform 21. Detachably mounted upon the upper end of core 102 is a packer or tamper head comprising a substantially cone shaped body or casing 105, provided with an annular downwardly projecting rim 106 at its base. Centrally at the upper end or apex of casing 105 is provided a vertical bearing 107 in which is slidably mounted an operating rod 108 upon the upper end of which is mounted an operating handle 109. Mounted upon the lower end of rod 108 is an operating head 110, the lower end of which is bifurcated and connecting the lower end of these bifurcations is a pin 111. Extending downwardly from the lower portion of casing 105 at opposite sides thereof are bifurcated ears 112 and 113, in which are pivotally mounted, at a short distance from one end, locking bars 114 and 115. The short upper ends of these bars extend outwardly from ears 112 and 113 and are adapted to project beneath a retaining ring 104 secured to the innerside of core 102 at its upper end. The other ends of bars 114 and 115 are curved inwardly and downwardly, as best shown in Fig. 9, and pass between the furcations of head 110, the ears 112 and 113 being offset sufficiently to cause the bars to pass each other, above pin 111 so that when head 110 is drawn upwardly by means of handle 109, pin 111 will carry the free ends of said bars upwardly thereby rocking the same on their respective pivots and withdrawing their short ends from beneath ring 104, and the tamper head may be removed.

In positioning the tamper head the handle 109 is grasped and the weight of the head will cause the same to slide downwardly thereby rocking bars 114 and 115 as above described. The tamper head is positioned upon the upper end of the core and the handle forced downwardly thereby locking the packer head in its position of use.

Secured to the inner side of casing 105 intermediate ears 112 and 113 are oppositely disposed downwardly extending lugs 116 and 117 which are adapted to fit into grooves 118 and 119 in ring 104 to prevent rotation of the tamper head with respect to the core.

Secured upon the outer periphery of rim 106, by bolts or other means are tampers 106ª which taper upwardly at their front ends to a sharp edge, the angle of taper or bevel being directly proportional to the speed with which the core rises and rotates as hereafter explained. Mounted upon platform 21 surrounding opening 103 is a holding member composed of two rectangular plates 121 and 122, hinged together at 123 to swing horizontally. A semi-circular opening is cut in each of the opposing edges of said plates 121 and 122 which when brought into register form an opening 120, concentric with opening 103 in platform 21. Projecting upwardly from plate 121 at its free end adjacent to plate 122 is an ear 124 in which is pivotally mounted one end of a link 125. The other end of link 125 is pivotally connected to an operating lever 126 at a short distance from its lower end. The lower end of lever 126 is pivotally mounted in an ear 127 on plate 122 (see Figs. 7, and 8) so that when the free end of lever 126 is moved to the right plates 121 and 122 will be moved toward each other or vice versa.

Mounted upon the upper face of said plates 121 and 122 to surrounding opening 120, are a plurality of equally spaced Z-shaped retaining lugs 128, which project inwardly and are adapted to project over the upper edge of a retaining ring 129 secured upon the lower end of the outer form or mold 130. Mold 130 is formed of flexible material preferably sheet steel rolled to a cylindrical form with the edges overlapping a short distance, and extending outwardly from its outer surface near the overlapping edges are a plurality of bifurcated ears 133 mounted in vertical alinement, in which ears are mounted one end of links 134. The other ends of links 134 are pivotally connected to one end of levers 135 rigidly mounted upon an operating shaft 136. Shaft 136 is revolubly mounted in bearings 137 mounted upon the opposite end of form 130 whereby when shaft 136 is rotated the overlapping ends will be brought to overlap a greater or less distance, according to the direction in which said shaft is rotated, thereby increasing or decreasing the diameter of said mold. A handle 138 is secured to shaft 136 is any desired position and serves as a means for rotating said shaft. A funnel or hopper 139 is detachably mounted upon the upper end of mold 130 when in use and serves to direct the material into the interior of the mold.

In the operation of my machine the parts will be in the positions shown. Suitable means for feeding material into the mold in a continuous stream will be provided. Power will be applied to rotate shaft 56, and through belt 62, shaft 50 thereby rotating gears 47 and 48 and with them the side bars 47ª and 48ª. Upon their rotation bars 47ª and 48ª will engage the arms 61 and 61ª of operating member 47ᵇ and rotate shaft 37 and its associated parts. The rotation of shaft 56 rotates eccentric 87 which through strap 86 causes operating bar 84 to oscillate vertically, thereby rocking member 78 on shaft 73, and through pawls 82 and 83 and ratchet wheels 80 and 81 rotating shaft 73. The rotation of shaft 73 rotates sprockets 68 and 69 and by means of chains 66 and 67 elevate sliding cross-heads 39 and 42 and with them shaft 37 and its adjunct parts. It will be readily understood that as long as the weight of the cross-heads and associated parts are upon the chains the ratchet wheels will return to their initial positions with the rotation of the eccentric and that when the weight is relieved from the chains the pawls will climb or gain one or more teeth on the ratchet wheels thus gradually elevating the cross-heads and core. As the core moves upwardly rotating at the same time, the tampers 106ª will draw a portion of the material being fed into the mold downwardly beneath said tampers whence it falls to the bottom of the mold and as the core descends it will strike and compact this material, successive layers being thus drawn down and compacted or tamped upon each up-and-down movement of the core, until the pipe is built up to the desired height. It will be understood that the relative proportion of rise of the core at each stroke, and the pitch of the tampers is such that the core rises considerably faster than the material is drawn beneath the tampers, and when the core descends it will fall a distance equal to its total rise, less the height of the material drawn down beneath the tampers, plus the amount the material is compacted by the fall of the core, which latter is governed by its weight and speed and it will thus be seen that the upward movement of the core is longer than its downward movement and that at each stroke thereof the pawls will climb or gain one or more teeth on the ratchet wheels according to the amount of material drawn down and thus gradually rotate shaft 73 and through chains 66 and 67 gradually elevate the cross-heads and core. It will also be noted that the speed with which the pipe is formed and its density is governed solely by the speed with which the material is drawn beneath the tampers. It will be noted further that a pipe of any desired height within the capacity of the mold can be formed without changing any of the parts by simply cutting off the feeding of material into the mold and also that uniform density is insured by reason of the fact that the core will not climb unless material is being fed into the mold, and that the amount the core rises at each stroke is determined by the amount of material drawn down by the tampers during the previous stroke. As the core rises in unison with the height of the pipe being formed the rotation of sprockets 68 and 69 permits counterweights 71 and 72 to descend until the lips 77 of relieving brackets 76 support long counterweight 71 holding the same inactive, the object being to increase the force with which the core descends as the pipe increases in height, it having been found in practice that greater pressure is required in tamping the pipe as it increases in height to insure uniform density. When the pipe has been formed to the required height lever 99 is moved to cause cams 91 and 92 to raise pawls 82 and 83 from engagement with their respective ratchet wheels thereby preventing further up-and-down movement of the core while still permitting its rotation. Core 102 is permitted to rotate a short while to smooth the upper end of the pipe, it being understood that the lower faces of the tampers are of a configuration to form a groove in the upper end of the pipe which fits over a tongue formed upon the opposite end. A ring of a configuration to form the tongue above mentioned is first placed in the bottom of the mold when the same is first positioned for use. The packer is then removed by grasping the handle and drawing the same upwardly as hereinbefore described.

Lever 99 is then moved still farther to the left to slide bearing 96 so as to bring gear 95 into mesh with rack bar 93 which returns the core and its associated parts to its starting position slowly, the object being to return the core to its starting position without undue strain as would be the case if it were permitted to fall unrestrained.

The mechanism is then stopped. Hopper 139 is then removed. Lever 126 is operated to open the holding member and release the mold and the same is removed to any desired place. Handle 138 is then operated to rotate shaft 137 and open the mold which is then raised off the pipe and is again closed and positioned for use within the holding member and the machine is again ready for use.

Having described my invention what I claim is:

1. A pipe forming machine comprising a stationary structure; a frame mounted in said structure to slide vertically; a shaft revolubly mounted at its lower end in said frame, vertically thereof, to move therewith; a core mounted on the upper end of said shaft; a packer head detachably mounted on said core; tampers on said packer head; a mold mounted on said stationary structure concentric with said core; means to rotate said shaft and core; and means to impart a vertical reciprocative movement to said frame, said tampers being adapted, during each upward movement of said core, to draw a portion of plastic material beneath the same, and upon the down movement of the core to tamp said material, whereby said core is caused to advance into said mold in a series of step-by-step movements.

2. A pipe making machine comprising a stationary structure; guide rails mounted in said structure to extend vertically thereof; a frame slidably mounted at its ends on said guide rails to slide longitudinally thereof; a shaft revolubly mounted in said frame vertically thereof and movable therewith; an operating member slidably and revolubly mounted on said shaft between the ends of said frame; means to hold said operating member against vertical movement; a transmission member rigidly mounted on said shaft adapted to engage said operating member and transmit rotation therefrom to said shaft; means to rotate said operating member; means to impart a vertically reciprocating movement to said frame; a core on the upper end of said shaft; a mold detachably mounted on said structure concentric with said core through which said core is adapted to pass upon the upward movement of said frame and core; means to supply plastic material into said mold; tampers secured to the upper end of said core adapted, during the upward movement of said core, to draw a predetermined amount of plastic material beneath the same and upon the down movement of said core to apply a combined tamping and troweling to said plastic material, whereby said core is caused to advance in a step-by-step movement through said mold.

3. In a pipe making machine having a stationary mold and a movable core, means to impart a vertical reciprocating movement to said core while the latter rotates whereby when plastic material is fed into said mold said core is prevented from returning to its lowermost starting point and is caused to advance through said mold in a series of step-by-step movements.

4. In a pipe making machine having a normally stationary mold and a movable core and tampers on said core; means to impart a combined rotary and reciprocating movement to said core, said tampers being adapted during the reciprocation of said core in one direction, to draw a predetermined amount of plastic material beneath the same and upon the reverse movement of the core to apply a combined tamping and troweling effect to said plastic material, said plastic material acting to prevent the full return of the core and tampers to their lowermost starting point whereby said core is caused to advance in a step-by-step movement through the mold, the amount of advance at each step being governed by the amount of plastic material drawn beneath the tampers; and means to supply plastic material into said mold.

5. A pipe making machine comprising a stationary structure; guide rails mounted in said structure to extend vertically thereof; a frame slidably mounted at its ends on said guide rails to slide longitudinally thereof; a stationary frame mounted at its ends on said guide rails within said movable frame; a shaft revolubly mounted in said movable frame vertically thereof and movable therewith; an operating member loosely mounted on said shaft within said stationary frame; a transmission member rigidly mounted on said shaft adapted to be engaged by said operating member when the same is rotated and transmit rotation therefrom to said shaft; means to operate said operating member; means operated by said last means adapted to impart alternate up and down movements to said frame; a core mounted at its lower end upon the upper end of said shaft to extend upwardly therefrom, a packer head on the upper end of said core detachably secured thereto; a mold mounted in said stationary structure concentric with said core whereby upon the upward movement of said movable frame said core will be projected through said mold; means to supply plastic material into said mold; and tampers extending outwardly from said packer head adapted to engage the plastic material upon the upward movement of the core and draw the same downwardly and upon the downward movement of the core to pack the down-drawn plastic material whereby an upward step by step movement is imparted to said frame and core.

6. In a pipe making machine having a stationary mold and a movable core and tampers on the core; means to supply plastic material into said mold; means to rotate said core; means to impart a vertical reciprocative movement to said core while the latter rotates at right angles thereto, the amount of relative upward travel being always the same, and the amount of relative downward travel being governed by the amount of plastic material being fed into said mold.

7. The method of forming pipe from plastic material which consists in placing plastic material within a mold, then projecting a rotating core having tamping means thereon through said mold in a series of up and down movements, said core on its upward movement forcing a portion of the plastic material downwardly and upon its downward movement engaging and compacting the plastic material thus forced down while rotating, these movements being repeated through successive steps until a predetermined height is reached.

8. The method of forming concrete pipe which consists in feeding plastic material into a mold, then projecting a rotating core having tampers on the end thereof through said plastic material in a series of up and down movements, said tampers being of such configuration that at each upward movement of the core a portion of the material being fed into the mold is drawn downwardly beneath said tampers, said tampers on the return movement of the core engaging said material and tamping the same, whereby a pipe is formed in a series of layers each layer being tamped and troweled sychronously.

THOMAS A. McMURTRIE.

Copies of this patent may be obtained for five cents each, by addressing the "Commissioner of Patents, Washington, D. C."